United States Patent
Valdez et al.

(10) Patent No.: US 10,400,771 B2
(45) Date of Patent: Sep. 3, 2019

(54) ECCENTRIC COMPENSATING TORSIONAL DRIVE SYSTEM

(71) Applicant: Air Squared, Inc., Broomfield, CO (US)

(72) Inventors: Justin Matthew Valdez, Broomfield, CO (US); Kenneth Lee Jump, Broomfield, CO (US)

(73) Assignee: Air Squared, Inc., Broomfield, CO (US)

( * ) Notice: Subject to any disclaimer, the term of this patent is extended or adjusted under 35 U.S.C. 154(b) by 338 days.

(21) Appl. No.: 15/373,979

(22) Filed: Dec. 9, 2016

(65) Prior Publication Data

US 2018/0163725 A1 Jun. 14, 2018

(51) Int. Cl.

| | |
|---|---|
| F04C 29/00 | (2006.01) |
| F16D 3/04 | (2006.01) |
| F04C 18/02 | (2006.01) |
| F01C 17/06 | (2006.01) |
| F16C 23/10 | (2006.01) |

(52) U.S. Cl.
CPC ........ F04C 29/0057 (2013.01); F01C 17/063 (2013.01); F04C 18/0215 (2013.01); F16C 23/10 (2013.01); F16D 3/04 (2013.01); F04C 2240/50 (2013.01); F04C 2240/807 (2013.01); F16C 2360/43 (2013.01)

(58) Field of Classification Search
CPC .............. F04C 18/0215; F04C 2240/50; F04C 29/0057; F04C 29/0085; F16D 3/04
See application file for complete search history.

(56) References Cited

U.S. PATENT DOCUMENTS

| | | | | |
|---|---|---|---|---|
| 4,300,875 A | * | 11/1981 | Fischer | F04C 29/0057 418/178 |
| 5,752,816 A | * | 5/1998 | Shaffer | F04C 18/0215 418/55.2 |
| 6,379,134 B2 | | 4/2002 | Iizuka | |
| 6,712,589 B2 | | 3/2004 | Mori et al. | |
| 6,736,622 B1 | | 5/2004 | Bush et al. | |
| 7,314,358 B2 | * | 1/2008 | Tsuchiya | F04C 29/0057 418/179 |
| 8,007,260 B2 | | 8/2011 | Yanagisawa | |
| 9,022,758 B2 | | 5/2015 | Roof et al. | |

* cited by examiner

Primary Examiner — Mary Davis
(74) Attorney, Agent, or Firm — Sheridan Ross P.C.

(57) ABSTRACT

An eccentric compensating torsional drive system for reducing the rotational eccentric conflict between multiple eccentric rotational movement limits on the eccentric offset within the drive system includes a motor, a first offset distance coupling, an offset floating bearing, and a dynamic element that is driven in a first offset distance rotation by the motor, coupling, and offset floating bearing. The dynamic element is pivotally connected to a static element via a pivotal offset bearing assembly having a substantially matching offset to the first offset distance. Operationally, the offset bearing can have relative rotational movement to the coupling and dynamic element to lessen the dynamic conflict as between the first offset distance and the pivotal offset bearing assembly, as the offset bearing acts as a floating variance in rotational offset via changing a radial position to the coupling and dynamic element.

16 Claims, 6 Drawing Sheets

ECCENTRIC COMPENSATING TORSIONAL DRIVE SYSTEM

TECHNICAL FIELD

The present disclosure relates generally to an apparatus that is generally an eccentric rotational motion apparatus that is operational as a fluid compressor. More specifically the eccentric compensating torsional drive system can be used to drive a scroll compressor or in any application that requires the accommodating of multiple rotational eccentric limits in a single drive train.

BACKGROUND

Motion control or movement limitation is important in kinetic assemblies, especially related to precise movement control such as allowing movement in one axis and significantly restricting movement in other axes. In one application, for a scroll compressor as an example, a positive displacement scroll is utilized via having a static Archimedes-type scroll channel and a mating dynamic Archimedes-type scroll channel, wherein the dynamic scroll channel moves in an eccentric manner in relation to the static scroll channel, thus causing a peristaltic-type fluid pumping action between the dynamic and static scroll channels. Although this type of compressor is well known in its basic form, there are desired modifications to the dynamic retention structure as between the dynamic and static scroll channels for more precise control and movement between the dynamic and static scroll channels wherein of necessity the dynamic scroll channel is eccentrically driven, typically by a motor with a rotationally offset output shaft that is operational to drive the dynamic scroll channel in an eccentric rotational motion.

Of course several problem arise with this type of drive train system. The first problem is the drive train system being off balance as a result of rotating a mass eccentrically, which requires a counteracting offset mass placed somewhere in the drive train system. The second problem is that there are multiple limits on the eccentric offset, wherein the hard structural eccentric limits on the structural dynamic interface between the dynamic and static scroll channels have a conflict with the hard structural offset of the drive motor output shaft eccentric offset. Thus these two eccentric offsets, being the dynamic structure between the dynamic and static scroll channels and the drive motor eccentric offset output shaft, effectively place two limits on eccentric rotational movement of the drive train system, wherein the conflict comes from essentially differential manufacturing tolerances, that within thousandths of an inch forces different eccentric limits, thus adding to drive train force and stress, resulting in higher vibration and loss of efficiency, plus potential accelerated component part wear.

One solution is to remove one of the eccentric limits, which of course would have to be in the structural dynamic interface between the dynamic and static scroll channels, as the drive motor eccentric output shaft offset is absolutely required to make the scroll compressor functional, i.e. driving the dynamic scroll channel in the required eccentric rotational motion. The issue with this solution is that typically an Oldham-type coupling is used at the structural dynamic interface between the dynamic and static scroll channels, which in a positive sense creates no eccentric offset limits, however, is less controlled (higher free movement tolerances) and requires lubrication and maintenance that all results in a less precise movement control between the dynamic and static scroll channels, which in turn reduces compressor efficiency. Another solution is to add a structural buffer in the drive train to cushion the conflict between the multiple limits on the eccentric offset, wherein the hard structural eccentric limits on the structural dynamic interface between the dynamic and static scroll channels have a conflict with the hard structural offset of the drive motor output shaft eccentric offset. This solution would maintain the high level of desirable control between the dynamic and static scroll channels while at the same time reducing wear, vibration, and inefficiency.

Looking at the prior art in this area, U.S. Pat. No. 6,736,622 to Bush, et al. discloses a scroll compressor comprising: a first scroll member having a base and a generally spiral wrap extending from said base; a second scroll member having a base and a generally spiral wrap extending from its base, a drive shaft having an eccentric pin for causing said second scroll member to orbit relative to said first scroll member. In Bush, the wraps of the first and second scroll members are interfitting to define compression chambers which are reduced in volume as the second scroll member orbits relative to said first scroll member. The wraps of the first and second scroll members are each formed from an origin on the first and second scroll members respectively, see Bush's FIGS. 2 and 3. Plus, each of the first and second scroll members have drive centers, with the drive center of the first scroll member being defined as a central axis of the drive shaft and the drive center of the second scroll member being defined as a center axis of the eccentric pin.

Further, in Bush, the origin of each of the first and second scroll members is offset in a similar direction from the drive centers of the first and second scroll members, with the offset being selected to reduce torque fluctuation and torque reversal during orbital motion of the second scroll member, see Bush's FIG. 4. Thus, Bush's wraps of the first and second scroll members are hybrid wraps, with variable thickness along a circumferential length of the wrap. Thus, in Bush, an origin point exists at the theoretical start of the scroll, which has typically been the offset motor drive center line also. In Bush there is an added offset to the existing offset center line of the drive scroll to specifically reduce drive torque amplitudes that come from pressure differences within the scrolls. Thus, Bush recognizes the problem of vibration, wear, and inefficiency from the eccentric movement in the scroll compressor and basically has a static double offset from the scroll centerline to the motor drive output shaft offset centerline to help alleviate torque reversals from the eccentric rotational movement.

Continuing in the prior art, U.S. Pat. No. 6,712,589 to Mori, et al. discloses a scroll compressor comprising: a compressor housing having an inlet port and an outlet port, and a drive scroll rotatably disposed within the compressor housing and having a rotational axis. In Mori, a driven scroll is rotatably disposed within the compressor housing and has a rotational axis, wherein the driven scroll rotational axis is offset to the drive scroll rotational axis and at least one compression chamber is defined between the drive scroll and the driven scroll. Further, in Mori a first bearing rotatably supports the drive scroll in a cantilever manner, a second bearing rotatably supports the driven scroll in a cantilever manner, and a means for permitting the driven scroll to move along the axial direction is provided.

Also, Mori has a means for biasing the driven scroll towards the drive scroll in an axial manner, wherein the biasing means comprises a discharge chamber defined within the compressor housing, the discharge chamber communicating with the outlet port and being disposed adjacent to the driven scroll, wherein refrigerant drawn into the at least one compression chamber via the inlet port and compressed within the at least one compression chamber is discharged into the discharge chamber, and the compressed refrigerant applies a force against the driven scroll that urges the driven scroll toward the drive scroll. In Mori, an Oldham coupling is used as in the prior art as being an offset drive coupling that utilizes an engaging slot disc with opposing slots typically perpendicular to one another, wherein the slots have a slidable engagement with one another. The novelty in Mori is in the axial compression control as between the scrolls.

Next in the prior art, U.S. Pat. No. 9,022,758 to Roof, et al. discloses a scroll compressor, comprising: a housing defining an internal cavity; a separator within the internal cavity of the housing separating a high pressure chamber from a low pressure chamber, the separator including a port fluidly communicating with the high pressure chamber; a fixed scroll body positioned within the low pressure chamber including a base, a scroll rib axially extending from a first side of the base, and an axially extending circular hub on a second opposite side of the base. In Roof, the circular hub defines a compression outlet extending through the circular hub and fluidly communicating with the high pressure chamber through the port. Further, a floating seal arrangement is interposed between the fixed scroll body and the separator, the floating seal arrangement sealing the compression outlet to the port and being axially moveable relative to the circular hub.

In Roof, the floating seal arrangement includes: a floating seal; a first seal interface between the separator and the floating seal; a second seal interface between the floating seal and the circular hub, the second seal interface including a first seal member interposed between the circular hub and the floating seal; and a seal retaining ring limiting axial movement of the first seal member relative to the circular hub and extending away from the base of the fixed scroll body. Also in Roof, the first seal member is a spring energized seal including a resilient seal jacket and a seal spring positioned within the resilient seal jacket. The resilient seal jacket is generally U-shaped in cross-section defining opposed seal surfaces, with the seal spring positioned between the opposed seal surfaces. Roof has the opposed seal surfaces being a radially outer leg portion and a radially inner leg portion facing generally radially away from one another, wherein the seal retaining ring has an outer diameter that is greater than an inner diameter of the radially inner leg portion when the retaining ring and the first seal member are attached to the fixed scroll body. Thus, in Roof the outer diameter of the seal retaining ring is greater than an inner diameter of the seal spring, wherein Roof has a limited axial motion of the seal with a seal retaining ring.

Next in the prior art, U.S. Pat. No. 8,007,260 to Yanagisawa discloses a scroll fluid machine that has a stationary scroll having a stationary scroll lap fixed to a scroll casing and an orbiting scroll having an orbiting scroll lap that orbits relative to the stationary scroll lap. In Yanagisawa, the stationary and orbiting scrolls are connected via a coupling mechanism other than an Oldham coupling or pin crank type mechanism having sliding parts. The coupling mechanism includes plate springs that connect the stationary scroll to the orbiting scroll. The orbiting scroll lap in Yanagisawa engages with the stationary scroll lap to form a closed compression chamber. This is essentially an offset drive coupling that has different structure from the Oldham coupling, via using plate spring members to eliminate the slidable engagement of slots that the Oldham coupling has, thus also eliminating lubrication from metal to metal rubbing. However, Yanagisawa does not address problems of spring fatigue and centrifugal forces acting upon the springs from rotation.

Continuing in the prior art, U.S. Pat. No. 6,379,134 to Iizuka discloses a scroll compressor comprising paired fixed and movable scrolls, the fixed scroll of each pair having an end plate provided with a scroll body projecting from the end plate and the movable scroll of each pair having an end plate provided with a scroll body projecting from the end plate. In Iizuka, the movable scroll meshes with the fixed scroll to form a plurality of operation chambers between them and revolves relative to the fixed scroll to compress gas in the operation chambers. Two pairs of fixed and movable scrolls are disposed with back faces of the end plates of the fixed scrolls opposite each other. The movable scrolls in Iizuka are integrally connected with each other, a main shaft for revolving the movable scrolls passes through the two pairs of fixed and movable scrolls to operatively engage the movable scrolls, and an outlet chamber is disposed between the end plates of the fixed scrolls. Thus, Iizuka attempts to axially balance compressor pressures with two opposing pairs of static and dynamic scrolls.

What is needed is a rotational eccentric structural buffer in the scroll compressor drive train to cushion the rotational eccentric conflict between the multiple eccentric movement limits on the eccentric offset, wherein the hard structural eccentric limits on the structural dynamic interface between the dynamic and static scroll channels have a conflict with the hard structural offset of the drive motor output shaft eccentric offset. This solution would maintain the high level of desirable movement control between the dynamic and static scroll channels (via not using an Oldham coupling) while at the same time reducing wear, vibration, and inefficiency of the scroll compressor drive train as a whole. Ideally this solution would be permanent in nature and not require any additional maintenance.

SUMMARY

Broadly, the present disclosure is an eccentric compensating torsional drive system for reducing the rotational eccentric conflict as between multiple eccentric rotational movement limits on the eccentric offset within the drive system. The eccentric compensating torsional drive system includes a means for creating rotational motion about a first rotational axis and a coupling having a primary end portion and an opposing secondary end portion. The coupling primary end portion is rotationally connected to the means for creating rotational motion about the first rotational axis. The secondary end portion has an output shaft about a second rotational axis, wherein the second rotational axis is parallel to the first rotational axis and the second rotational axis is offset from the first rotational axis by a first offset distance.

The eccentric compensating torsional drive system further includes an offset bearing having a proximal rotational axis and a parallel positioned distal rotational axis, the proximal rotational axis and the distal rotational axis offset from one another by a second offset distance. The offset bearing also has a first end portion and an opposing second end portion wherein the proximal and distal axes both span therebetween. The offset bearing further has an outer perimeter that is positioned about the distal axis and an inner perimeter that is positioned about the proximal axis, wherein the inner perimeter is disposed within the outer perimeter and is slidably engaged to the output shaft.

The eccentric compensating torsional drive system also includes a dynamic element having a first dynamic axis, the dynamic element having a first aperture that is positioned about the first dynamic axis. The first aperture is slidably engaged to the offset bearing outer perimeter. The dynamic member also has a second aperture that is about a second dynamic axis, wherein the first and second dynamic axes are parallel to one another. Also included is a static element having a first static axis, the static element also having a third aperture about the first static axis, wherein the first and second dynamic axes are parallel to the first static axis.

The eccentric compensating torsional drive system additionally includes a means for creating the first offset distance rotationally as between the second dynamic axis via the second aperture and the first static axis via the third aperture, wherein operationally the dynamic element moves in relation to the static element in a rotational manner via the first offset distance as driven by the means for creating rotational motion through the coupling. The offset bearing can have relative rotational movement to the output shaft and the first aperture to lessen the dynamic conflict as between the first offset distance and the means for creating the first offset distance in the torsional drive system, as the offset bearing acts as a floating variance in rotational offset via the second offset distance changing a radial position about the proximal axis.

These and other objects of the present disclosure will become more readily appreciated and understood from a consideration of the following detailed description of the exemplary embodiments of the present disclosure when taken together with the accompanying drawings.

REFERENCE NUMBERS IN THE DRAWINGS

Figure 1:
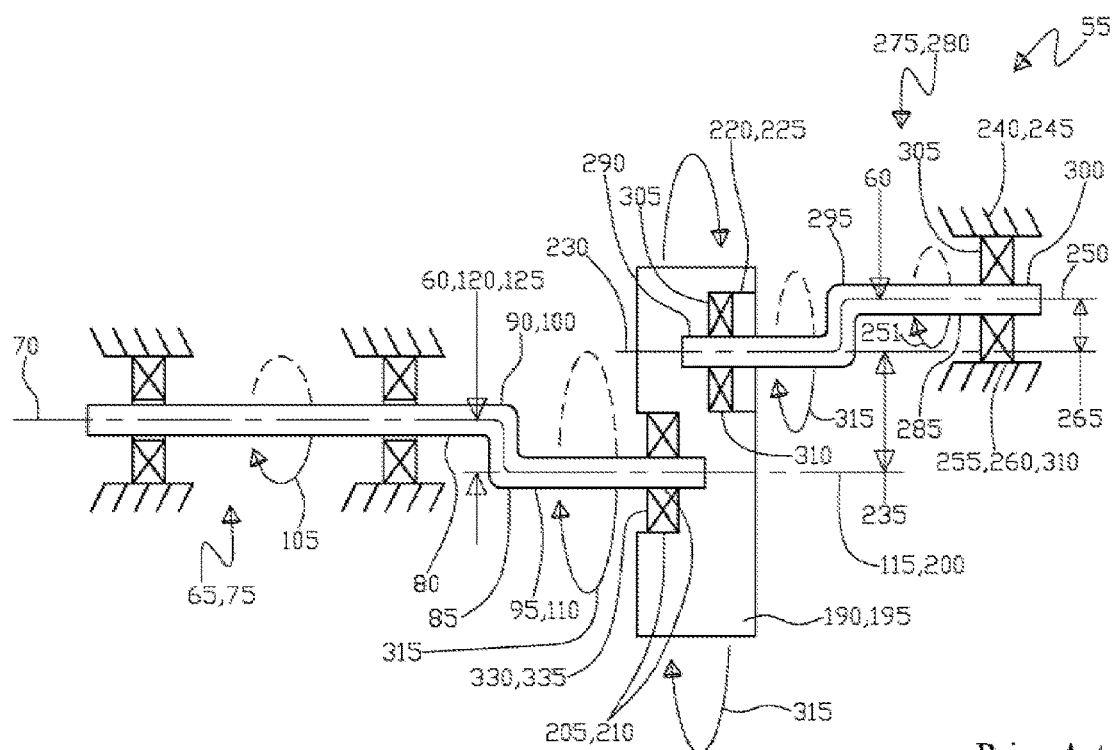
FIG. 1 shows a schematic view of a prior art eccentric torsional drive system.

50 Eccentric compensating torsional drive system;
55 Scroll compressor assembly;
60 Multiple eccentric rotational movement limits on the eccentric offset;
65 Means for creating rotational motion;
70 First rotational axis;
75 Motor;
80 Drive shaft of the motor 75;
85 Coupling;
90 Primary end portion of the coupling 85;
95 Secondary end portion of the coupling 85;
100 Rotational connection of the primary end portion 90 to the means 65 for creating rotational motion;
105 Rotational motion about the first rotational axis 70;
110 Output shaft of the coupling 85;
115 Second rotational axis of the coupling 85;
120 Parallel position of the first rotational axis 70 and the second rotational axis 115;
125 First offset distance;
130 Offset bearing;
135 Proximal rotational axis of the offset bearing 130;
140 Distal rotational axis of the offset bearing 130;
145 Parallel position of the proximal rotational axis 135 and the distal rotational axis 140;
150 Second offset distance;
155 First end portion of the offset bearing 130;
160 Second end portion of the offset bearing 130;
165 Outer perimeter of the offset bearing 130;
170 Outer diameter of the offset bearing 130;
175 Inner perimeter of the offset bearing 130;
180 Inner diameter of the offset bearing 130;
185 Slidable engagement of the inner perimeter 175/inner diameter 180 to the output shaft 110;
190 Dynamic element;
195 Dynamic compressor scroll element;
200 First dynamic axis;
205 First aperture;
210 First inside diameter;
215 Slidable engagement of the first aperture 205/first inside diameter 210 to the outer perimeter 165/outer diameter 170 of the offset bearing 130;
220 Second aperture;
225 Second inside diameters;
230 Second dynamic axis;
235 Parallel position of the first 200 and second 230 dynamic axes;
240 Static element;
245 Static compressor scroll element;
250 First static axis;
251 Rotational motion about the first static axis 250;
255 Third aperture;
260 Third inside diameter;
265 Parallel position of the first 200 and second 230 dynamic axes to the first static axis 250;
275 Means for creating the first offset distance 125 rotationally as between the second dynamic axis 230 in the second aperture 220 and the first static axis 250 in the third aperture 255;
280 Pivotal bearing assembly having opposing ends that are offset by the first offset distance 125;
285 Shaft;
290 Dynamic end portion of the shaft 285;
295 Mid portion of the shaft 285 having the first offset distance 125;
300 Static end portion of the shaft 285;
305 Housing bearing;
310 Slip fit of the housing bearing 305 with the second inside diameter 225 and the third inside diameter 260;
315 Rotational manner of movement as between the dynamic element 190 and the static element 240/first static axis 250 via the first offset distance 125;
320 Relative rotational movement of the offset bearing 130 to the output shaft 110 and the first aperture 205/first inside diameter 210;
325 Changing radial position of the offset bearing 130 via changing a radial position about the proximal axis 135 to "float" the offset bearing 130 about the proximal axis 135;
326 Floating orbit of the proximal rotational axis 135 about the distal axis 140 during the relative rotational movement 320 and changing radial position 325;
330 Drive bearing;
335 Ball bearing;

336 Inner ring of the ball bearing 335;
340 Shoulder;
341 Total axial length of the offset bearing 130 including shoulder 340;
342 Axial length if the offset bearing 130 without the shoulder 340;
343 Outer diameter of the shoulder 340;
345 Axial retention of the shoulder 340;
350 First tangential/radial slidable engagement clearance;
355 Second tangential/radial slidable engagement clearance; and
360 Outer radial force equivalent from the multiple eccentric rotational movement limits 60 being mismatched due to manufacturing tolerances that cause offset bearing 130 relative rotational movement 320, 325, 326 thus the offset bearing 130 acting as a torsional buffer to increase efficiency and reduce vibration of the torsional drive system 50, 55 due to the multiple eccentric rotational movement limits 60 being mismatched due to manufacturing tolerances.

DETAILED DESCRIPTION

With initial reference to FIG. 1, shown is a schematic view of the prior art for an eccentric torsional drive system that is more particularly potentially in the form of a scroll compressor that includes a means 65 for creating rotational motion 105, and a coupling 85 that has a first offset distance 125, thus creating the eccentric rotational output resulting in a dynamic element 190 having the eccentric rotational manner of movement 315. However, as FIG. 1 shows, this eccentric rotational manner of movement 315 is also bounded by a means 275 for creating the first offset distance 125 thus also controlling movement as between the dynamic element 190 and a static housing 240. The prior art system results in two limits, which are the coupling 85 first offset distance 125 and the means 275 for creating the same first offset distance 125 in a singular drive train system. Thus in FIG. 1 the problem shown is that these two offset distance 125 limits will always have slightly different manufacturing and assembly tolerances, thus causing a conflict of rotational offset distance limits that increases vibration and reduces efficiency of the drive system while it is in rotational 105 operation 315.

Figure 2:
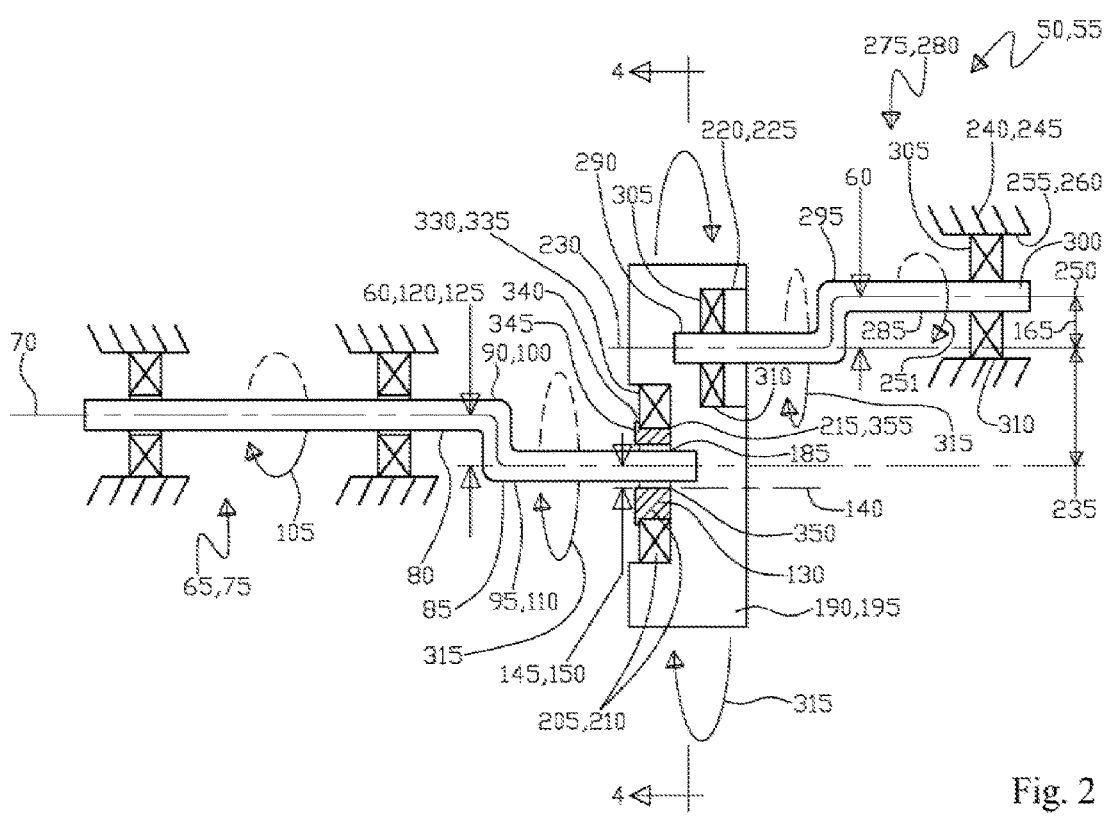
FIG. 2 shows a schematic view of an eccentric compensating torsional drive system according to embodiments of the present disclosure.

Continuing to FIG. 2, shown is a schematic view similar to FIG. 1 except for the present disclosure of the eccentric compensating torsional drive system 50 that has the addition of the offset bearing 130 to the prior art drive system shown in FIG. 1. Also shown in FIG. 2 is the proximal 135 (shown in FIG. 3) and distal 140 rotational axes being positioned parallel 145 to one another with the second offset distance 150 and further with the first 350 and second 355 radial slidable engagements on the offset bearing 130 to allow the offset bearing 130 to radially float 320, 325 (shown in FIG. 4) the second offset distance 150 to help absorb the FIG. 1 described issue of the two offset limits 125 which will have slightly different tolerances, causing a conflict of limits that increases vibration and reduces efficiency, wherein the floating 320, 325, 326 offset bearing 130 reduces these undesirable attributes.

Figure 3:
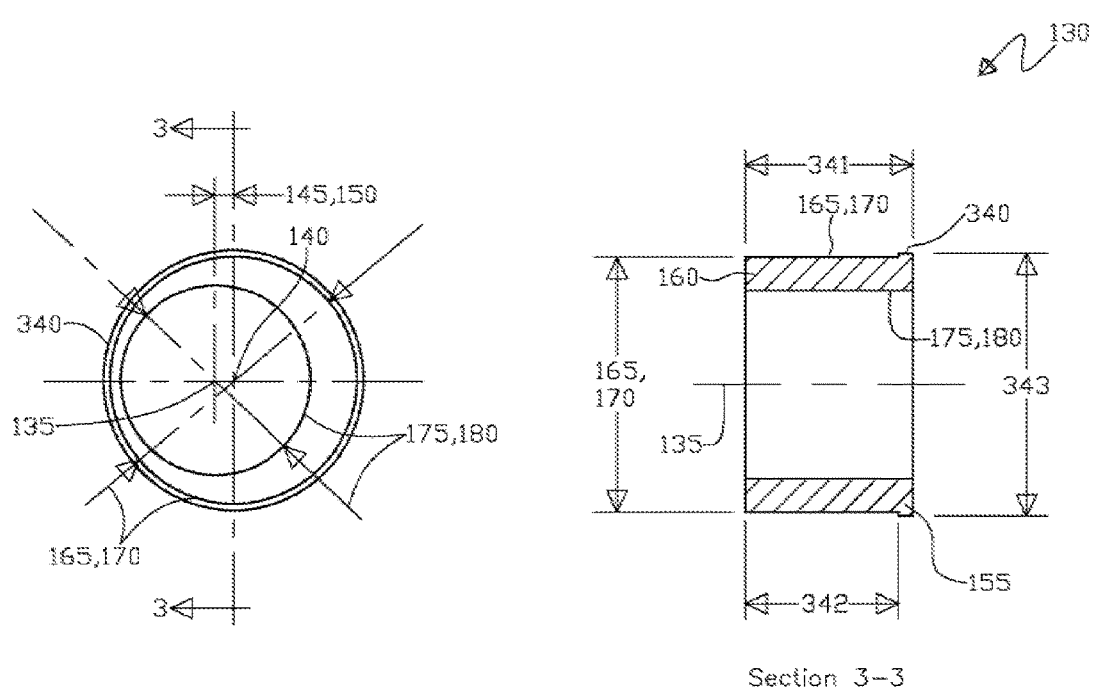
FIG. 3 shows a cross section and end view of an offset bearing according to embodiments of the present disclosure.
Figure 4:
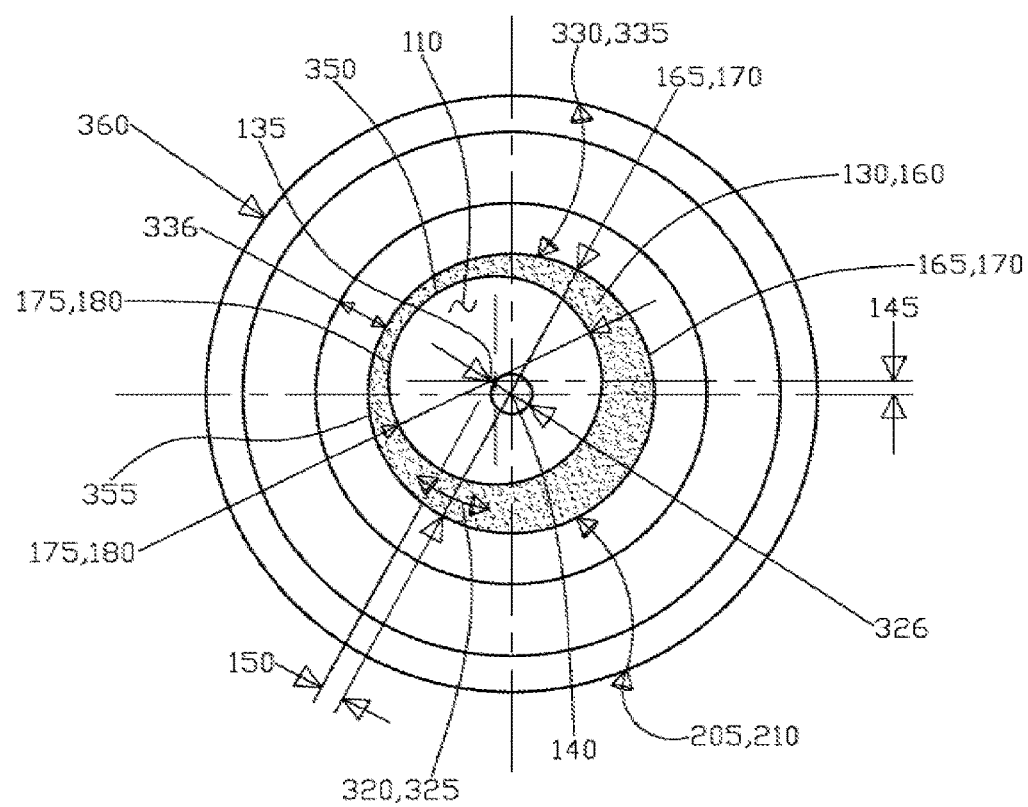
FIG. 4 shows an end view of the offset bearing of FIG. 3 according to embodiments of the present disclosure.

Next, FIG. 3 shows a cross section and end view of the offset bearing 130, that more clearly shows the proximal 135 and distal 140 rotational axes, the second offset distance 150, the first 155 and second 160 end portions of the offset bearing 130, the outer perimeter 165/diameter 170 plus the inner perimeter 175/diameter 180 in addition to the shoulder 340 that is on the outer perimeter 165 on the first end portion side 155. Further, FIG. 4 shows the end view of the offset bearing 130 as shown in FIG. 3, wherein the offset bearing 130 is disposed within the drive bearing 330 or preferably ball bearing 335. Also shown in FIGS. 3-4 are the proximal 135 and distal 140 rotational axes, the second offset distance 150, the outer perimeter 165/diameter 170 plus the inner perimeter 175/diameter 180 of the offset bearing 130 in addition to the shoulder 340 that is on the outer perimeter 165 on the first end portion side 155. Also, FIG. 4 shows the first 350 and second 355 radial slidable engagements, in addition to the relative rotational movement 320, 325, 326 of the offset bearing 130 to the output shaft 110 and to the drive bearing 330 which further accommodates relative movement 320, 325, 326 to the first aperture 205/first inside diameter 210. The foregoing results in the changing radial position 320, 325, 326 of the offset bearing 130 via changing a radial position 320, 325, 326 about the proximal axis 135.

Figure 5:
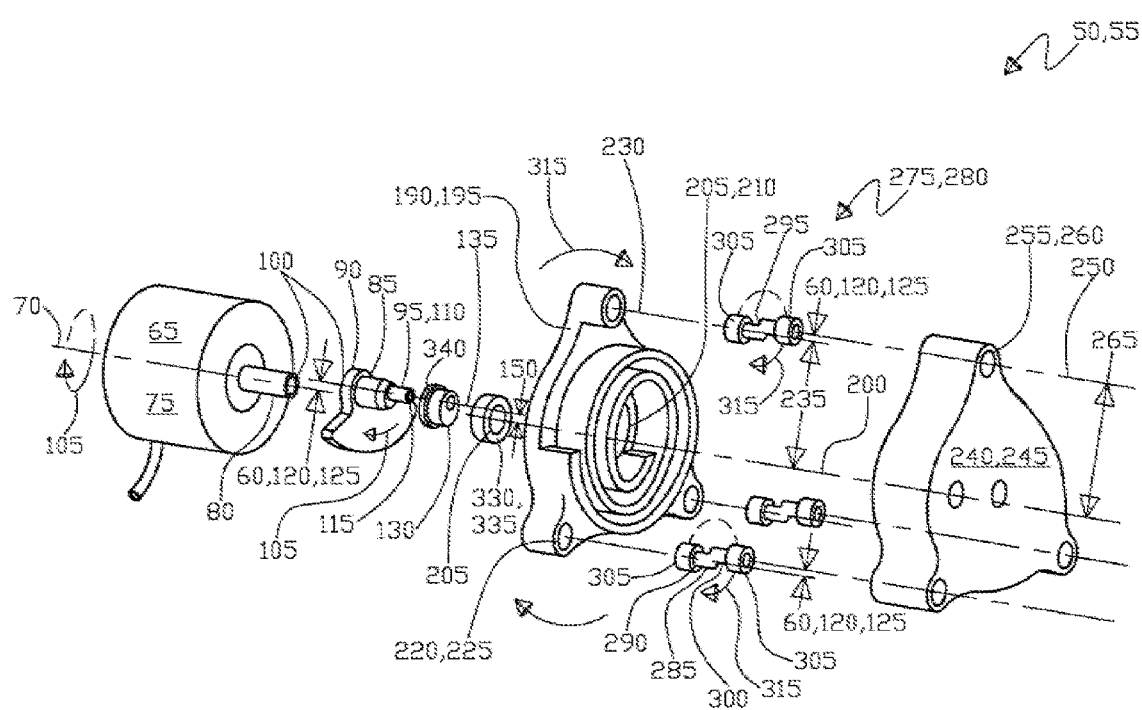
FIG. 5 shows an exploded perspective view of an eccentric compensating torsional drive system according to embodiments of the present disclosure.

Continuing, FIG. 5 shows an exploded perspective view of the entire eccentric compensating torsional drive system 50 according to embodiments of the present disclosure, starting with the means 65 for creating rotational motion 105 or motor 75, with the drive shaft 80 of the motor 75, then moving to the coupling 85 with its primary 90 and secondary 95 end portions with the first offset distance 125 to the output shaft 110 of the coupling 85, that is in turn rotationally connected 100 to the offset bearing 130 that is in turn connected to the dynamic element 190 preferably through the drive bearing 330 or ball bearing 335. In addition, FIG. 5 shows the dynamic element 190 being offset 150 that is pivotally connected to the static element 240 via the means 275 for creating the first offset distance 125 that includes a pivotal bearing assembly 280 that has a shaft 285 with a dynamic end portion 290 of the shaft 285, a mid-portion 295 of the shaft 285, and a static end portion 300 of the shaft 285, including housing bearings 305 of the dynamic 290 and static 300 end portions of the shaft 285, and finally a termination with the static element 240. FIG. 5 also shows the general case of the eccentric compensating torsional drive system 50 as embodied in the schematic in FIG. 2, however, more particularly the eccentric compensating torsional drive system 50 can be a scroll compressor, wherein the dynamic 190 and static 240 elements are the compressor scroll elements respectively, wherein some of the scroll compressor housings and supports are removed or not shown for pictorial clarity.

Figure 6:
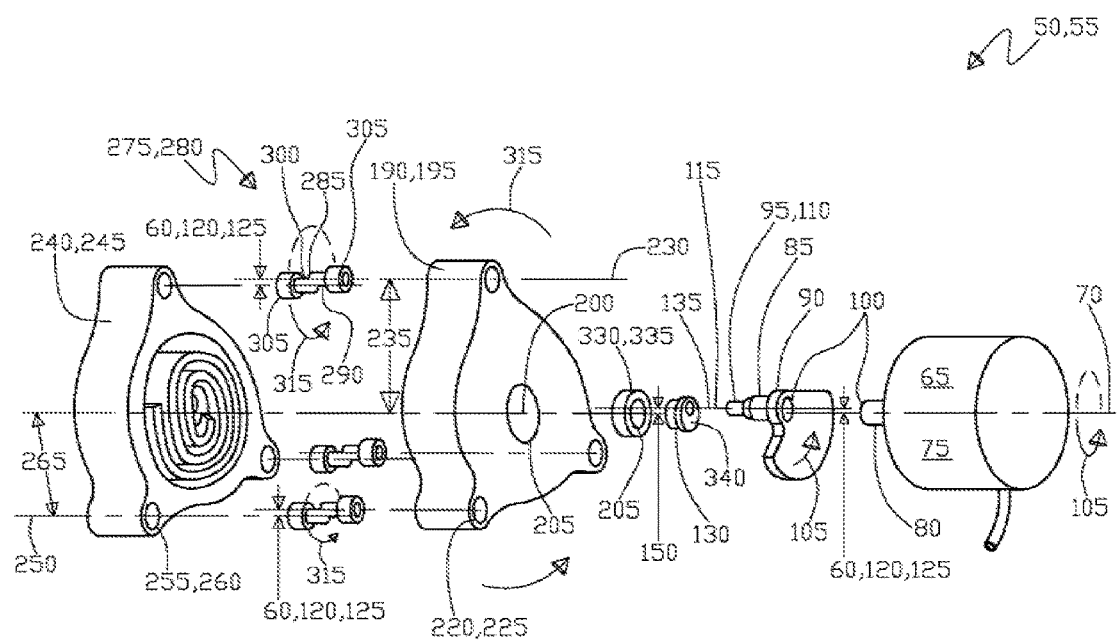
FIG. 6 shows another exploded perspective view of the eccentric compensating torsional drive system according to embodiments of the present disclosure.

Continuing, FIG. 6 is the complementary view of FIG. 5, in that the exploded perspective view is reversed to give an opposing angle view of the exploded perspective assembly of the eccentric compensating torsional drive system 50.

Broadly, the present disclosure of the eccentric compensating torsional drive system 50 is for reducing the rotational eccentric conflict as between multiple eccentric rotational movement limits 60 on the eccentric offset within the drive system, see in particular FIG. 1 for the Prior Art. The eccentric compensating torsional drive system 50 includes the means 65 for creating rotational motion 105 about the first rotational axis 70 and the coupling 85 having the primary end portion 90 and the opposing secondary end portion 95, see FIGS. 2, 5, and 6. The coupling 85 primary end portion 90 is rotationally connected 100 to the means 65 for creating rotational motion 105 about the first rotational axis 70, the secondary end portion 95 having the output shaft 110 that is about the second rotational axis 115, wherein the second rotational axis 115 is parallel 120 to the first rotational axis 70, and the second rotational axis 115 is offset from the first rotational axis 70 by the first offset distance 125, as best seen in FIGS. 2 to 6.

The eccentric compensating torsional drive system 50 further includes the offset bearing 130 having the proximal rotational axis 135 and the parallel positioned 145 distal rotational axis 140, where the proximal rotational axis 135 and the distal rotational axis 140 are offset from one another by a second offset distance 150, the offset bearing 130 also having the first end portion 155 and the opposing second end portion 160 wherein the proximal 135 and distal 140 axes both span therebetween, see in particular FIGS. 3 and 4, or more generally FIGS. 2, 5, and 6. The offset bearing 130 further has the outer perimeter 165 that is positioned about the distal axis 140 and an inner perimeter 175 that is positioned about the proximal axis 135, wherein the inner perimeter 175 is disposed within the outer perimeter 165 and is slidably engaged 185 to the output shaft 110, see in particular FIGS. 3 and 4, or more generally FIGS. 2, 5, and 6.

The eccentric compensating torsional drive system 50 also includes a dynamic element 190 having the first dynamic axis 200, the dynamic element 190 having the first aperture 205 that is positioned about the first dynamic axis 200, the first aperture 205 is slidably engaged 215 to the offset bearing 130 outer perimeter 165, see FIGS. 2, 5, and 6. The dynamic element 190 also has a second aperture 220 that is about a second dynamic axis 230, wherein the first 200 and second 230 dynamic axes are parallel 235 to one another, see FIGS. 2, 5, and 6. Also included is the static element 240 having a first static axis 250 and a third aperture 255 that is about the first static axis 250, wherein the first 200 and second 230 dynamic axes are parallel 265 to the first static axis 250, see FIGS. 2, 5, and 6.

The eccentric compensating torsional drive system 50 additionally further includes a means 275 for creating the first offset distance 125 rotationally as between the second dynamic axis 230 via the second aperture 220 and the first static axis 250 via the third aperture 255, see in particular FIGS. 2, 5, and 6. Operationally, the dynamic element 190 moves in relation to the static element 240 in a rotational manner 315 via the first offset distance 125 as driven by the means 65 for creating rotational motion through the coupling 85, see in particular FIGS. 2, 5, and 6. The offset bearing 130 can have relative rotational movement 320, 325 to the output shaft 110 and the first aperture 205 to lessen the dynamic conflict as between the first offset distance 125 and the means 275 for creating the first offset distance 125 in the torsional drive system 50 as the offset bearing 130 acts as a floating variance in rotational offset via the second offset distance 150 changing a radial position 320, 325, 326 about the proximal axis 135, that essentially manifests from radial force 360, see FIGS. 2, 4, 5, and 6.

As an option, the eccentric compensating torsional drive system 50 can further comprise the drive bearing 330 that is disposed between the outer perimeter 165 and the first aperture 205 to operationally further facilitate the offset bearing 130 floating variance 320, 325, 326, see specifically FIG. 4 and generally FIGS. 2, 5, and 6. Further, preferably the drive bearing 330 is a ball bearing 335, again, see specifically FIG. 4 and generally FIGS. 2, 5, and 6.

As another option, for the eccentric compensating torsional drive system 50, the second offset distance 150 is preferably about fifteen percent (15%) of the first offset distance 125, see FIGS. 2, 3, and 4. Thus for the specific embodiment 50 the second offset distance 150 is preferably about 0.056 inches and the first offset distance 125 is preferably about 0.38 inches, which distances were found to be around an optimum for reducing vibration and increasing efficiency of the torsional drive system 50 for effectuating movement 320, 325, 326 that acts as a torsional buffer. Alternatively, for the eccentric compensating torsional drive system 50, on the first tangential slidable engagement 350 clearance that is between the output shaft 110 and the inner perimeter 175 and the second tangential slidable engagement 355 clearance in between the outer perimeter 165 and an inner ring 336 of the drive 330 or ball 335 bearing, wherein the first tangential slidable engagement clearance 350 is preferably about one-hundred and twenty-five percent (125%) of the second tangential slidable engagement clearance 355, see FIG. 4 in particular. For the eccentric compensating torsional drive system 50, the first tangential slidable engagement clearance 350 is preferably about 0.0025 inches tangentially and the second tangential slidable clearance 355 is preferably about 0.002 inches tangentially to accommodate the higher bearing load at the first tangential slidable engagement clearance 350 due to its smaller size at the output shaft 110 in relation to the larger size at the outer perimeter 165.

As a further option, for the eccentric compensating torsional drive system 50, the offset bearing 130 can further include the shoulder 340 that is disposed on the outer perimeter 165 first end portion 155, wherein operationally the shoulder 340 helps to axially retain the offset bearing 130 in helping to retain 345 the offset 130 bearing along the distal axis 140, the total length 341 of the offset bearing 130 including the shoulder 340 is shown along with the axial length 342 of the offset bearing 130 without the shoulder 340 is shown, and the outer diameter 343 is shown of the shoulder 340 is shown, see FIG. 3 for the shoulder 340 and FIG. 2 for the axial retention 345. As another option, for the eccentric compensating torsional drive system 50 the first tangential slidable engagement clearance 350 is about point eight-five percent (0.85%) of the inner perimeter 175, which was found to be around an optimum for reducing vibration and increasing efficiency of the torsional drive system 50 for effectuating movement 320, 325, 326 that acts as a torsional buffer, see FIGS. 2 to 6.

As a further option for the eccentric compensating torsional drive system 50, the second tangential slidable engagement clearance 355 is about point five percent (0.5%) of the outer perimeter 165, which was found to be around an optimum for reducing vibration and increasing efficiency of the torsional drive system 50 for effectuating movement 320, 325, 326 that acts as a torsional buffer, see FIGS. 2 to 6.

For the preferred embodiment, in a specific application the eccentric compensating torsional drive system 50 is on a scroll compressor 55 for reducing the rotational eccentric conflict as between multiple eccentric rotational movement limits 60 on the eccentric offset 125, wherein the hard structural eccentric movement limits 60 on the structural dynamic interface between the dynamic 195 and static 245 scroll compressor channel housings have a conflict with the hard structural offset 125 of the drive motor 75 output shaft 110 eccentric offset 125, looking at FIGS. 2 to 6. The eccentric compensating torsional drive system 55 includes the motor 75 for creating rotational motion 105 about the first rotational axis 70, wherein the motor 75 has a drive shaft 80, see FIGS. 2, 5, and 6.

The eccentric compensating torsional drive system for a scroll compressor 55 also includes a coupling 85 having the primary end portion 90 and an opposing secondary end portion 95, see FIGS. 2, 5, and 6. The primary end portion 90 is rotationally connected 100 to the drive shaft 80 about the first rotational axis 70, the secondary end portion 95 having the output shaft 110 that is about the second rotational axis 115, wherein the second rotational axis 115 is parallel 120 to the first rotational axis 70 and the second rotational axis 115 is offset from the first rotational axis 70 by the first offset distance 125, as best seen in FIGS. 2 to 6.

The eccentric compensating torsional drive system for a scroll compressor 55 further includes the offset bearing 130 having the proximal rotational axis 135 and the parallel positioned 145 distal rotational axis 140. The proximal rotational axis 135 and the distal rotational axis 140 are offset from one another by the second offset distance 150, the offset bearing 130 also having the first end portion 155 and the opposing second end portion 160, wherein the proximal 135 and distal 140 axes both span therebetween, see in particular FIGS. 3 and 4, or more generally FIGS. 2, 5, and 6. The offset bearing 130 further has the outer diameter 165 that is positioned about the distal axis 140 and the inner diameter 180 that is positioned about the proximal axis 135, wherein the inner diameter 180 is disposed within the outer diameter 170 and is slidably engaged 185 to the output shaft 110, see in particular FIGS. 3 and 4, or more generally FIGS. 2, 5, and 6.

The eccentric compensating torsional drive system for a scroll compressor 55 additionally includes the dynamic compressor scroll element 195 having the first dynamic axis 200 and the first inside diameter 210 that is positioned about the first dynamic axis 200, where the first inside diameter 210 is slidably engaged 215 to the offset bearing 130 outer diameter 170, see FIGS. 2,5, and 6. The dynamic compressor scroll element 195 also has a plurality of second inside diameters 225 that are each about one of a plurality of second dynamic axes 230, wherein the first 200 and second 230 dynamic axes are all parallel 235 to one another, see FIGS. 2, 5, and 6.

The eccentric compensating torsional drive system for a scroll compressor 55 also further includes the static compressor scroll element 245 having a plurality of first static axes 250, the static compressor scroll element 245 also having a plurality of third inside diameters 260 that are each about one of the plurality of first static axes 250, wherein the first 200 and second 230 dynamic axes, the first static axis 250, and the plurality of first static axes 250 are all parallel 265 to one another, see FIGS. 2, 5, and 6.

The eccentric compensating torsional drive system for a scroll compressor 55 additionally includes the plurality of pivotal bearing assemblies 280 each having opposing ends that are offset by said first offset distance 125. The pivotal bearing assembly 280 includes the shaft 285 having the dynamic end portion 290, the mid-portion 295 having the first offset distance 125, and the static end portion 300, see FIGS. 2, 5, and 6. The dynamic end portion 290 has the housing bearing 305 that has a slip fit 310 with the second inside diameter 225, and the static end portion 300 has the housing bearing 305 that has the slip fit 310 to the third inside diameter 260. Further, the rotational motion 251 is shown about the first static axis 250 and the rotational movement 315 is shown about the first static axis 250, again see FIGS. 2, 5, and 6.

Operationally, the dynamic element 195 moves in relation to the static element 240 in a rotational manner 315 via the first offset distance 125 as driven by the motor 75 for creating rotational motion 105 through the coupling 85 output shaft 110 that is at the first offset distance 125 that drives the offset bearing 130 through the first inside diameter 210. The offset bearing 130 can have relative rotational movement 320, 325, 326 to the output shaft 110 and the first inside diameter 210 to lessen the dynamic conflict as between the first offset distance 125 and the plurality of pivotal bearing assemblies 280 in the torsional drive system 55, as the offset bearing 130 acts as a floating variance in rotational offset via the second offset distance 150 changing a radial position 320, 325, 326 about the proximal axis 135, that essentially manifests from radial force 360, see FIGS. 2, 4, 5, and 6.

Optionally, the eccentric compensating torsional drive system for a scroll compressor 55 can further comprise the drive bearing 330 that is disposed as between the outer diameter 170 and the first inside diameter 210 to operationally further facilitate the offset bearing 130 floating variance 320, 325, 326, see specifically FIG. 4, and generally FIGS. 2, 5, and 6. Further, preferably the drive bearing 330 is a ball bearing 335, again, see specifically FIG. 4 and generally FIGS. 2, 5, and 6.

Again, optionally for the eccentric compensating torsional drive system for a scroll compressor 55, the second offset distance 150 is preferably about fifteen percent (15%) of the first offset distance 125, see FIGS. 2, 3, and 4. Thus for the specific embodiment 55 the second offset distance 150 is preferably about 0.056 inches and the first offset distance 125 is preferably about 0.38 inches, which distances were found to be around an optimum for reducing vibration and increasing efficiency. Alternatively, for the eccentric compensating torsional drive system 55, with regard to the first radial slidable engagement 350 clearance that is between the output shaft 110 and the inner diameter 180, and the second radial slidable engagement 355 clearance in between the outer diameter 170 and an inner ring 336 of the drive 330 or ball 335 bearing, the first radial slidable engagement clearance 350 is preferably about one-hundred and twenty-five percent (125%) of the second radial slidable engagement clearance 355, see FIG. 4 in particular. For the eccentric compensating torsional drive system 55, the first radial slidable engagement clearance 350 is preferably about 0.0025 inches radially and the second radial slidable clearance 355 is preferably about 0.002 inches radially to accommodate the higher bearing load at the first radial slidable engagement clearance 350 due to its smaller size at the output shaft 110 in relation to the larger size at the outer diameter 170.

Again, alternatively for the eccentric compensating torsional drive system for a scroll compressor 55, the offset bearing 130 can further include a shoulder 340 disposed on the outer diameter 170 first end portion 155, wherein operationally the shoulder 340 helps to axially retain 345 (see FIG. 2) the offset bearing 130 in the drive 330 or ball 335 bearing along the distal axis 140. In FIG. 3, the total length 341 of the offset bearing 130 including the shoulder 340 is shown, along with the axial length 342 of the offset bearing 130 without the shoulder 340. The outer diameter 343 including the shoulder 340 is also shown.

As another option, for the eccentric compensating torsional drive system for a scroll compressor 55 the first radial slidable engagement clearance 350 is about point eight-five percent (0.85%) of the inner diameter 180, which amount was found to be around an optimum for reducing vibration and increasing efficiency of the torsional drive system for the scroll compressor 55 for effectuating movement 320, 325, 326 that acts as a torsional buffer, see FIGS. 2 to 6.

As a further option for the eccentric compensating torsional drive system for the scroll compressor 55, the second radial slidable engagement clearance 355 is about point five percent (0.5%) of the outer diameter 170, which amount was found to be around an optimum for reducing vibration and increasing efficiency of the torsional drive system for the scroll compressor 55 for effectuating movement 320, 325, 326 that acts as a torsional buffer, see FIGS. 2 to 6.

Accordingly, the present disclosure of an eccentric compensating torsional drive system has been described with some degree of particularity directed to the embodiments of the present disclosure. It should be appreciated, though, that the present disclosure is defined by the following claims, and modifications or changes may be made to the exemplary embodiments of the present disclosure without departing from the inventive concepts contained therein.

The invention claimed is:

1. An eccentric compensating torsional drive system for reducing the rotational eccentric conflict as between multiple eccentric rotational movement limits on the eccentric offset within the drive system, said eccentric compensating torsional drive system comprising:
   (a) a motor for creating rotational motion about a first rotational axis;
   (b) a coupling having a primary end portion and an opposing secondary end portion, said primary end portion rotationally connected to the motor for creating rotational motion about the first rotational axis, the secondary end portion having an output shaft about a second rotational axis, the second rotational axis parallel to the first rotational axis and offset from the first rotational axis by a first offset distance;
   (c) an offset bearing having a proximal rotational axis and a parallel positioned distal rotational axis, the proximal rotational axis and the distal rotational axis offset from one another by a second offset distance, the offset bearing also having a first end portion and an opposing second end portion wherein the proximal and distal axes both span therebetween, the offset bearing further having an outer perimeter that is positioned about the distal axis and an inner perimeter that is positioned about the proximal axis, wherein the inner perimeter is disposed within the outer perimeter and is slidably engaged to the output shaft;
   (d) a dynamic element having a first dynamic axis and a first aperture that is positioned about the first dynamic axis, the first aperture slidably engaged to the offset bearing outer perimeter, the dynamic element also having a second aperture that is positioned a second dynamic axis, wherein the first and second dynamic axes are parallel to one another;
   (e) a static element having a first static axis and a third aperture that is positioned about the first static axis, wherein the first and second dynamic axes are parallel to the first static axis; and
   at least one bearing assembly for creating the first offset distance rotationally as between the second dynamic axis via the second aperture and the first static axis via the third aperture, wherein operationally the dynamic element moves in relation to the static element in a rotational manner via the first offset distance as driven by the motor for creating rotational motion through the coupling, wherein the offset bearing can have relative rotational movement to the output shaft and the first aperture to lessen the dynamic conflict as between the first offset distance and the at least one bearing assembly for creating the first offset distance in the torsional drive system, as the offset bearing acts as a floating variance in rotational offset via the second offset distance changing a radial position about the proximal axis.

2. An eccentric compensating torsional drive system according to claim 1, further comprising a drive bearing that is disposed as between the outer perimeter and the first aperture to operationally further facilitate the offset bearing floating variance.

3. An eccentric compensating torsional drive system according to claim 2, wherein the drive bearing is a ball bearing.

4. An eccentric compensating torsional drive system according to claim 3, wherein a first tangential slidable engagement clearance is between the output shaft and the inner perimeter and a second tangential slidable engagement clearance is between the outer perimeter and an inner ring of the drive bearing, wherein the first tangential slidable engagement clearance is substantially one-hundred and twenty-five percent (125%) of the second tangential slidable engagement clearance.

5. An eccentric compensating torsional drive system according to claim 4, wherein the first tangential slidable engagement clearance is substantially point eight-five percent (0.85%) of the inner perimeter.

6. An eccentric compensating torsional drive system according to claim 4 wherein the second tangential slidable engagement clearance is substantially point five percent (0.5%) of the outer perimeter.

7. An eccentric compensating torsional drive system according to claim 2, wherein the offset bearing further includes a shoulder disposed on the outer perimeter first end portion, wherein the shoulder helps to axially retain the offset bearing along the distal axis.

8. An eccentric compensating torsional drive system according to claim 1, wherein the second offset distance is substantially fifteen percent (15%) of the first offset distance.

9. An eccentric compensating torsional drive system on a scroll compressor for reducing the rotational eccentric conflict, comprising:
   (a) a motor for creating rotational motion about a first rotational axis, wherein the motor has a drive shaft;
   (b) a coupling having a primary end portion and an opposing secondary end portion, the primary end portion rotationally connected to the drive shaft about the first rotational axis, the secondary end portion having an output shaft that is positioned about a second rotational axis, the second rotational axis parallel to the first rotational axis and offset from the first rotational axis by a first offset distance;
   (c) an offset bearing having a proximal rotational axis and a parallel positioned distal rotational axis, the proximal rotational axis and the distal rotational axis offset from one another by a second offset distance, the offset bearing also having a first end portion and an opposing second end portion wherein the proximal and distal axes both span therebetween, the offset bearing further having an outer diameter that is positioned about the distal axis and an inner diameter that is positioned about the proximal axis, wherein the inner diameter is disposed within the outer diameter and is slidably engaged to the output shaft;
   (d) a dynamic compressor scroll element having a first dynamic axis and a first inside diameter that is positioned about the first dynamic axis, the first inside diameter slidably engaged to the offset bearing outer diameter, the dynamic compressor scroll member also having a plurality of second inside diameters that are each about one of a plurality of second dynamic axes, wherein the first and second dynamic axes are all parallel to one another;
   (e) a static compressor scroll element having a plurality of first static axes, the static compressor scroll element also having a plurality of third inside diameters that are each positioned about one of the plurality of first static axes, wherein the first and second dynamic axes, the first static axis, and the plurality of first static axes are all parallel to one another; and (f) a plurality of pivotal bearing assemblies each having opposing ends that are offset by the first offset distance and including a shaft having a dynamic end portion, a mid-portion having the first offset distance, and a static end portion, the dynamic end portion having a housing bearing that has a slip fit with the second inside diameter and the static end portion having a housing bearing that has a slip fit with the third inside diameter, wherein operationally the dynamic element moves in relation to the static element in a rotational manner via the first offset distance as driven by the motor for creating rotational motion through the coupling output shaft that is at the first offset distance that drives the offset bearing through the first inside diameter, wherein the offset bearing can have relative rotational movement to output shaft and the first inside diameter to lessen the dynamic conflict as between the first offset distance and the plurality of pivotal bearing assemblies in the torsional drive system as the offset bearing acts as a floating variance in rotational offset via the second offset distance changing a radial position about the proximal axis.

10. An eccentric compensating torsional drive system according to claim 9, further comprising a drive bearing that is disposed between the outer diameter and the first inside diameter to operationally further facilitate the offset bearing floating variance.

11. An eccentric compensating torsional drive system according to claim 10, wherein the drive bearing is a ball bearing.

12. An eccentric compensating torsional drive system according to claim 11, wherein a first radial slidable engagement clearance is between the output shaft and the inner diameter and a second radial slidable engagement clearance is between the outer diameter and an inner ring of the drive bearing, wherein the first radial slidable engagement clearance is substantially one-hundred and twenty-five percent (125%) of the second radial slidable engagement clearance.

13. An eccentric compensating torsional drive system according to claim 12, wherein the first radial slidable engagement clearance is substantially point eight-five percent (0.85%) of the inner diameter.

14. An eccentric compensating torsional drive system according to claim 12 wherein the second radial slidable engagement clearance is substantially point five percent (0.5%) of the outer diameter.

15. An eccentric compensating torsional drive system according to claim 10, wherein the offset bearing further includes a shoulder disposed on the outer diameter first end portion, wherein operationally the shoulder helps to axially retain the offset bearing in the drive bearing along the distal axis.

16. An eccentric compensating torsional drive system according to claim 9, wherein the second offset distance is substantially fifteen percent (15%) of the first offset distance.

* * * * *

UNITED STATES PATENT AND TRADEMARK OFFICE
CERTIFICATE OF CORRECTION

PATENT NO. : 10,400,771 B2
APPLICATION NO. : 15/373979
DATED : September 3, 2019
INVENTOR(S) : Justin Matthew Valdez and Kenneth Lee Jump Page 1 of 1

It is certified that error appears in the above-identified patent and that said Letters Patent is hereby corrected as shown below:

In the Claims

Claim 1, Column 13, Lines 43-44: delete "a second aperture that is positioned a second dynamic axis," and insert --a second aperture that is positioned about a second dynamic axis,--

Claim 1, Column 13, Line 50: insert paragraph marker --(f)-- at the beginning of the paragraph Claim 9, Column 15, Lines 19-20: delete "can have relative rotational movement to output shaft", and insert --can have relative rotational movement to the output shaft--

Signed and Sealed this
Twenty-ninth Day of October, 2019

Andrei Iancu
*Director of the United States Patent and Trademark Office*